May 17, 1932.  W. S. DIETRICH  1,859,076
METHOD AND APPARATUS FOR HANDLING FREIGHT
Filed Feb. 12, 1932   2 Sheets-Sheet 1
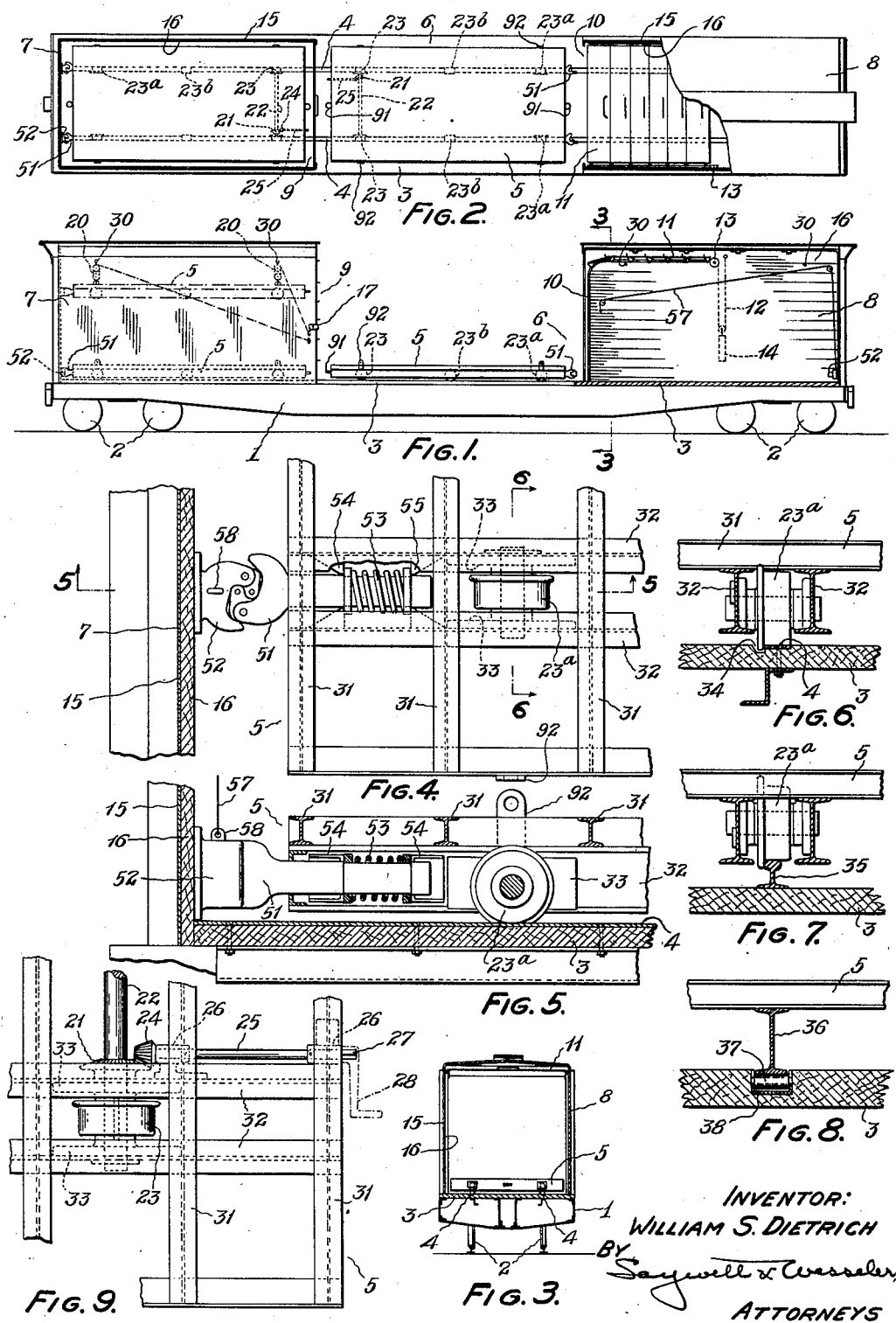
INVENTOR:
WILLIAM S. DIETRICH
BY
ATTORNEYS May 17, 1932.  W. S. DIETRICH  1,859,076
METHOD AND APPARATUS FOR HANDLING FREIGHT
Filed Feb. 12, 1932  2 Sheets-Sheet 2

INVENTOR:
WILLIAM S. DIETRICH
BY
ATTORNEYS

Patented May 17, 1932

1,859,076

UNITED STATES PATENT OFFICE

WILLIAM S. DIETRICH, OF GREENVILLE, PENNSYLVANIA

METHOD AND APPARATUS FOR HANDLING FREIGHT

Application filed February 12, 1932. Serial No. 592,585.

This invention, as indicated, relates to a method and apparatus for handling freight. More particularly, it comprises a special freight car structure adapted for use with overhead hoisting apparatus, and also load positioning and load cushioning means associated therewith, and the method of handling freight by the use of primary and secondary cars and a distributive system. It also includes a railway car or the like, providing one or more housings permanently attached to the floor of said car, and providing on said car adjacent said housing or housings an open space adapted to serve as a loading platform for moving the load into the car housing with greater facility than is provided by the usual freight platforms and the like for loading side door freight cars.

It also includes the use of what might be designated a "dolly car," which serves as a portable loading platform either while positioned in the open space on said car or loaded at a point remote from said car, and which is moved into the enclosed housings from such open platform on the car, and may be locked or resiliently coupled therein.

It also includes a method of handling freight wherein a car provided with closed permanent housings is supplied with movable dollies or platforms, which serve as the load support for the freight in transit, and also serve as a freight protecting and cushioning means by reason of the special buffer and shock absorbing attachments provided on said movable platforms and within said car housing.

It also includes the provision of trackways on the car floor, such trackways preferably having the same gauge as the gauge of the track on which the car is supported, in order to permit such dolly to be bodily lifted from the tracks on the car and placed upon the tracks in the plant, warehouse or the like, where the car is to be loaded or unloaded, and moved to a position where the material carried on said dolly may be used when received as a shipment, or packed and loaded when being prepared for shipment.

The invention includes the provision of a freight car body having a plurality of compartments wherein common use of a single open loading platform at an intermediate position of the car, brings about effective loading without unduly extending the car length as compared with existing cars for like load capacity, such platform serving as the means for loading, in turn, the housing at either end of the car.

The invention also includes the provision of separate housings so that freight may be shipped in less than standard carload lots on a car of standard carload capacity, each such subdivision of freight being in a locked compartment and protected against interference therewith by other shippers while in transit, and having abundant loading and unloading space without interference with any other shipment at any time.

The invention also has in view the use of the open loading space as a shipping means, such space being suitable for the placing of heavy machinery or various open car shipments, such shipments being if desired for destinations short of the destinations of the shipments in the closed housings adjacent such open space, or to the same destination.

The invention also includes a combination of shock absorber equipment on a platform or load supporting means within the car, which will reduce the damage to the freight now commonly experienced when shipments are made of heavy freight which moves from its anchorage when the train is subjected to sudden changes of speed or of direction.

The invention also includes many details of construction of general application to freight cars, but which are of a peculiar utility in connection with the special type of freight car hereinafter described.

The invention also includes the conversion of standard box cars, preferably of steel construction, into open platform and fixed housing type cars corresponding to the new type of car construction herein described, by cutting away the side and top portions of such box cars and placing vertical lift type sliding doors or other doors over the ends of the enclosed car sections which remain after the removal of the side doors and central structure. It likewise includes the equipment of such cars with dollies and trackways, if desired, together with the special appurtenances hereinafter described, such as shock absorbers and the like.

The invention also includes the method of using standard overhead hoisting apparatus for loading the dollies when positioned on the open platforms of the cars, and also the handling of such dollies with their loads as units, and maintaining said loads intact, and distributing such dollies and loads throughout a plant on special trackways or on standard railway tracks, so that equal facility in load-handling may be obtained as is now possible with cars having what have been designated "unit containers", or compartment freight cars with removable sections, without requiring special gantry cranes or like heavy crane equipment, for handling such heavy compartments or requiring special trucks and load distributing means apart from what is supplied with the car.

The invention also provides for the use of lift type sliding doors such as are used in garages and which thus interfere in no way with the loading or unloading of the car, and require no excess of space at the side of the car, as when hinged doors are used.

Present practice in railroad freight handling has shown a tendency toward improvement chiefly in the matter of providing unit compartments to transport freight without breaking bulk from shipper to consignee in a locked compartment of special construction handled upon a special freight car and by special truck and a specially designed hoisting device. There has also been great activity in providing special freight and package trucks and wheeled handling and hoisting devices for loading and unloading box cars and the like.

All of these expedients, however, do not result in the large economies of operation which must be brought about if the competition with the motor truck is to be met. It is particularly important that the rolling stock used must be of general utility so that revenue loads may be carried in each direction.

At present an automobile manufacturer receives steel sheets in packages in gondola cars because of greater convenience in loading and unloading, and must have large box cars to ship his finished product. Each type of car frequently makes its return trip empty, whereas with a car of the type herein described all of the advantages of open car loading are retained with the safety and protection of the closed car shipment. Thus ten thousand cars can easily render the service and yield a revenue of fifteen thousand cars through greater turn-over and at the same time the shipper will save time by obtaining delivery of raw materials in a car he can at once load with finished products. If there is no return shipment from the consignee of the original shipment, the space available being in two locked sections may be independently used by smaller shippers and a larger revenue realized under existing rates than would be received from the full car load.

Other uses and objects of the invention will appear in the course of the following description.

To the accomplishment of the foregoing and related ends, said invention, then, consists of the means and methods hereinafter fully described and particularly pointed out in the claims. The annexed drawings and the following description set forth in detail certain structures embodying such invention and the method of handling freight, such disclosed means and method constituting, however, but several of various applications of the principle of my invention.

In said annexed drawings:

Figure 1 is a side elevation showing a railroad car embodying the principles of my invention, said view being partly in section;

Figure 2 is a top plan view of the structure shown in Figure 1, a portion of the roof being cut away to show the interior construction;

Figure 3 is a transverse sectional view taken along the line 3—3 shown in Figure 1 looking in the direction of the arrow;

Figure 4 is a fragmentary plan view showing a corner of the dolly car;

Figure 5 is a detail view partly in section taken along the line 5—5 shown in Figure 4;

Figure 6 is a detail view partly in section taken along the line 6—6 shown in Figure 4;

Figure 7 is a view similar to Figure 6 showing a slightly modified form of dolly and dolly supporting rail;

Figure 8 is a detail view showing a still further modified form of dolly and dolly supporting means;

Figure 9 is a fragmentary plan view showing a rearward portion of the dolly car with a driving mechanism installed thereon;

Figure 10:
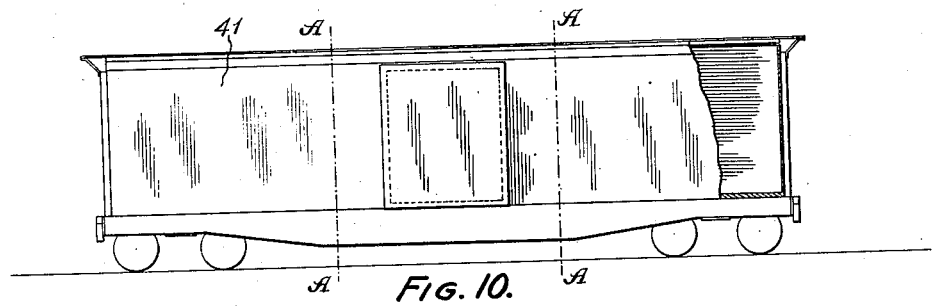
Figure 10 is a side elevation partly in section showing a standard type freight car preliminary to conversion into an intermediate open platform type car by cutting along the lines A—A shown in Figure 10.
Figure 11:
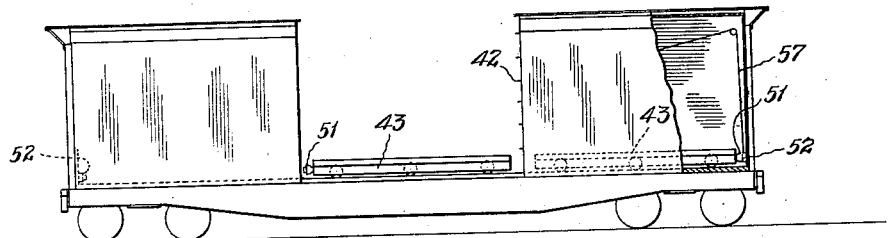
Figure 11 is a view partly in section showing the converted structure produced from a car of the type shown in Figure 10.

As is clearly shown in Figures 1 and 2 of the drawings, my preferred type of car comprises a frame 1 with suitable running gear 2 and provided with a floor 3 extending substantially from end to end thereof, said floor preferably being provided with a trackway 4 of standard gage to receive the wheels of a dolly car 5 adapted to be positioned thereon at a central open space 6 intermediate a pair of fixed housings, 7, 8, having door openings 9, 10, at their inner ends adjacent the central open space.

The housings are preferably constructed along the lines of standard box cars with the exception that their inner ends are left open over substantially their entire free area and a sliding door 11 guided upon suitable trackways is adapted to form a closure for the same by being drawn vertically downward from a position beneath the roof of the car after the manner of garage doors and the like. Said doors may be provided with cables 12 running over pulleys 13 to counterweights 14 concealed in the side walls of the car. The car as shown in Figures 1 and 2 may have a metal outer shell 15 and may have an inner wood lining 16 preferably of tongue and grooved boards. Said sliding doors are preferably provided with the handholds providing a ladder by which access to the roof of the car may be obtained, and which also serve as additional means for handling the door. Suitable locking devices 17 may be applied at the bottom or sides of the door to lock the compartment securely after it has been loaded.

The car is preferably made of somewhat more than the usual length in order that the fixed housings thereon may have a cubic capacity equivalent to that of a standard freight car, and at the same time provide at an intermediate position of the car an open space which may be designated a loading platform preferably of slightly greater length than the length of either compartment. This increased length for the central space is to provide for the free loading of a dolly car with freight by means of an overhead crane such as is now almost universally found at all points of freight origin and distribution. Where desired, a crane of sufficient capacity may be provided to bodily lift the dolly from the open platform of the car and place it at any suitable point for the reception or loading of the goods to be shipped.

When a dolly is loaded by means of a crane, while in a central loading space on the car, as soon as such loading is completed the dolly is moved on its trackway 4 within the fixed car housing by any suitable means, such as a block and tackle in the case of heavy freight, or special driving means on the dolly or in a position to move the dolly. Such driving means, as is shown in Figure 9, may comprise a beveled drive gear 21 on the wheel shaft 22 supporting the flanged wheels 23 of the dolly, the driving gear being engaged by a bevel pinion 24 on a stub shaft 25 supported beneath the dolly in special brackets 26 and having a squared end 27 projecting beyond the rearward edge of the dolly where it may be engaged by a detachable hand crank 28 or other operating means. When one compartment is so loaded, the door may be closed and locked, and the dolly in the other compartment may be drawn outwardly to the open platform of the car and the loading process repeated, after which the dolly is moved into such other compartment and the door is closed and locked. Thus by providing the intermediate loading space and fixed car compartments of substantially one-half the capacity of a standard freight car of the box car type now in general use, very rapid loading of the car may take place, and at the same time the shipment may be divided into two substantially equal parts, either of which is more readily accessible for unloading purposes than with a like quantity of goods positioned within a standard type of box car. Furthermore, all of the inconvenience of loading a box car through a side door wherein the use of overhead hoisting equipment is impractical, is avoided and a very great saving of time and labor is effected.

When a shipment has been made in the manner just described, if the dolly is not required for the goods being forwarded on the return trip, the dolly may be hoisted to the roof of the compartment by means of block and tackle 20, or chain hoist, suspended from rings 30, and retained in position when it is required for a further shipment.

The construction of the dolly may take various forms, that illustrated in Figures 4 to 6 inclusive showing a frame structure built up of cross beams 31 and having six wheels 23, 23a, and 23b, four such wheels being flanged and the intermediate wheels 23b being without flanges to permit the dolly to be used on tracks running in a curved direction. The wheels are preferably mounted between longitudinal beams 32 on special brackets 33 and the wheels having the flanges are adapted to ride over trackways comprising metal plates having a shallow groove 34 in the floor adjacent thereto to receive the flange. The wheels, as stated, are spaced standard gage distance from each other so that the dolly may be operated on standard gage railroad tracks if desired. The rearward pair of wheels 23 as stated are on a common shaft 22. In place of having a plate with a shallow groove on the floor of the car frame, rails 35 may be provided within the housings, said rails extending from end to end of the car floor. Likewise the dolly in place of having wheels may be provided with I-beams 36 at substantially the position of the wheels, said I-beams being adapted to have their lower flanges received within depressions in the floor of the car, and engage upon rollers 37 mounted in channel ways 38 fitted in such depressions, thus permitting the free movement of the dolly into and out of the housing.

When it is desired to convert a standard type of freight car into a car having two fixed housings and an intermediate loading platform, the operation illustrated in Figures 9 and 10 may be carried out, the care superstructure 41 being severed along the lines A—A shown in Figure 9 by means of any suitable operation, and the cut ends being finished to provide suitable runways for a sliding door 42 of the type shown in Figures 1 and 2 heretofore described. Suitable trackways are then laid lengthwise of the floor and a dolly car 43 is supplied for each fixed housing.

While a dolly car has been described in connection with the several types of structures above mentioned, it is obvious that many of the advantages of this type of car structure may be obtained without the use of the dolly car inasmuch as the facility of loading is greatly increased through the provision of a loading platform on the car adjacent the housing irrespective of the means used for moving the load endwise into the closed compartment. Likewise it is not intended to restrict the scope of the invention to a car provided with two fixed housings inasmuch as a plurality of such housings may be provided on a single car, or a central housing may be provided with open loading spaces adjacent the ends of the car or adjacent one end of the car, or a series of open loading spaces may be provided intermediate a series of fixed car housings, having end openings with suitable closures therefor. Likewise where it is desired side doors may be provided for the cars in order to permit access to any particular shipment when the central loading platform has been filled with a load of open car freight, and thus the advantage of the end door may be utilized at either the point of loading or unloading, and the less convenient method of loading or unloading of the car may be used at the other end of the line of shipment.

With dollies of the character above described, a very great advantage in the handling of freight is obtained by reason of the shock absorbers which may be applied to the ends of the dolly, as shown in Figures 4 and 5, of the drawings. These shock absorbers 51, 52, comprise devices such as heretofore have been used as coupling means for cars and other like structures, wherein one coupling member 52 is secured to the closed end wall of the fixed housing, and the companion coupling member 51 is mounted on the dolly in alignment therewith, said second coupling member having a buffer spring 53 intermediate a pair of abutments 54, 55, on the dolly car frame and having an extension bar 56 having shoulders cooperating with collars bearing against the ends of the buffer spring.

The coupling members engage automatically and may be released by means of a cable 57 supported in the housing and adapted to withdraw the locking pin 58 of the fixed coupling member 52. On moving the dolly into the fixed housing, automatic coupling will take place after the dolly has moved to its limit of motion within such compartment. In order to take care of the tendency of the dolly to shift when the train goes around curves at high speed it is desirable to provide two coupling members at the closed end of the fixed compartment for each dolly.

Thus any loads supported on the dolly are cushioned against shock, which otherwise would be transmitted directly to the load, and which in the normal course of freight car operation results annually in the expenditure of a large amount of money as compensation for damages for injuries caused to shipment. The importance of cushioning the load, therefore, is very great from the standpoint of economy in railroad operation, and is readily accomplished through the means just described. The dolly may be provided centrally of each end with a draw-bar eye 91 and with apertured side plates 92 to provide for attachment of hoisting chain hooks.

Figure 12:
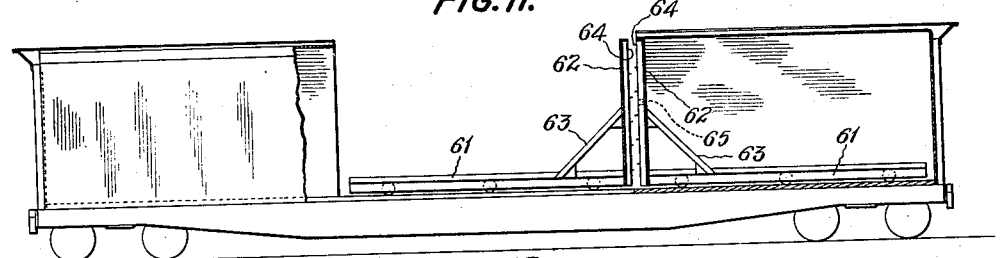
Figure 12 is a side elevation partly in section showing a modified form of car structure, embodying the principles of my invention, wherein the end closure for the car end section is carried on the dolly car.

In the form of construction illustrated in Figure 12, in place of using a sliding door to close the open end of the fixed housing adjacent the platform, the dolly 61 itself is provided with an end wall 62 which may correspond to the conventional car end wall construction, and which may be supported by suitable side braces 63 at one end of the dolly, so that when the dolly is moved into the adjacent housing, the vertical end wall on the dolly will register with the margins of the opening in the fixed housing and form a weather-tight closure therefor. The margins of the opening may be beveled and provided with heavy timber abutments, so that a slight cushioning effect will be obtained for the load, or a resilient frame (not shown) may be provided against which the end closure carried by the dolly abuts, and a cushioning effect of higher degree may be thus obtained. The end wall of the dolly may be provided on its outer side with hand holds 64 forming a ladder by means of which access may be obtained to the roof of the car. A suitable locking device 65 may be provided at the side or bottom of the fixed wall of the dolly.

The dolly car may be provided with walls about all of the ends and sides, instead of merely the rearward end as shown in Figure 12, and thus provide in effect a gondola car to telescopically engage within the housing, and the sides might extend to extreme roof clearance for bulk loading such as powdered coal, cement, flour, sand, and the like. Spouts or hoppers for self-unoalding might also be provided.

While it has been indicated that each car will preferably be provided with a dolly for each compartment, such dolly to be drawn up toward the roof of the car when it is not required for the particular type of freight being transported, it is to be understood that other forms of dollies than the platform type may be used, including the hopper type of dolly mentioned in the preceding paragraph. Likewise certain plants may be provided with dollies having a length to readily engage within the car and preferably having coupler elements to engage with the coupler elements on the inner wall of the housing.

Through the use of dollies, it will be found that a large percentage of the damage caused to car floors under present practice will be eliminated, inasmuch as such floors are usually built into the car proper and any repairs thereon involve a large expense and take the car out of service. Where the dolly floor receives the wear and becomes the point of attachment for various types of blocking to support particular loads such as would ordinarily be nailed to the floor of a standard box car, the only damage is to the floor of the dolly, and since the dolly is readily removable and replaceable by a substitute dolly of like structure, the car is at no time taken out of service.

Where a dolly is hoisted toward the roof of the car, in order to prevent undue sway of the dolly at such elevated position, a pair of fixed coupling members may be secured to the inner end wall of the housing at an elevated plane in line with the raised position of the dolly and the two couplings with their buffer springs will then serve to assist in anchoring the dolly against swinging movement which might cause damage to the car walls.

Figure 13:
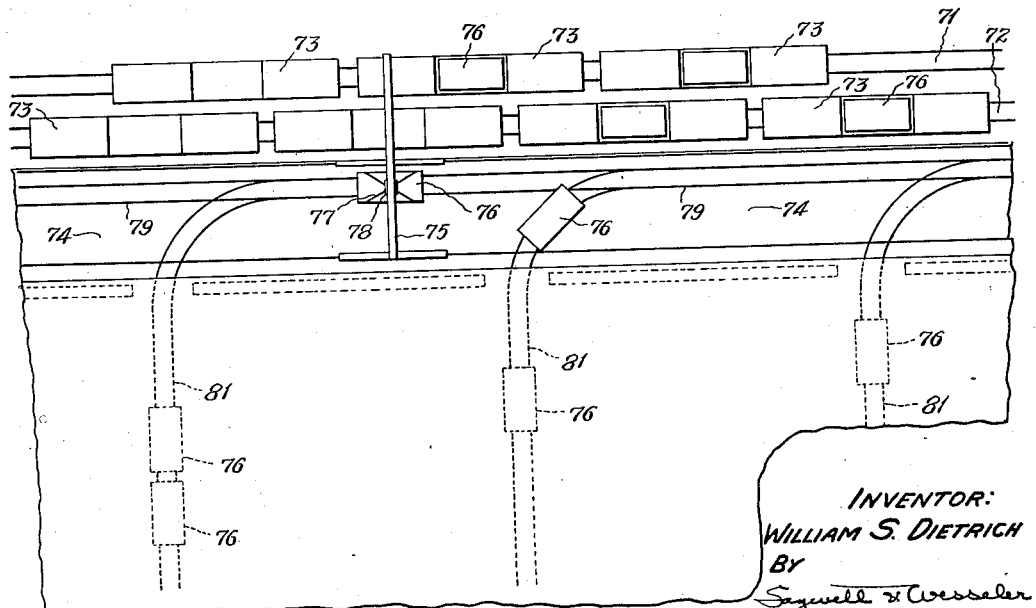
Figure 13 is a diagrammatic plan view illustrating a plant with means for distributing dollies to the points of loading and unloading.

The method of handling the freight which the car structures above described provide a basis for, is diagrammatically illustrated in Figure 13, wherein receiving tracks 71, 72, for the trains of open center platform cars 73 with fixed end compartments are shown as extending along a freight platform 74 of a plant upon which is mounted a gantry crane 75. The gantry crane as shown is adapted to engage a dolly 76 by means of a series of chains 77 suspended from a hoist trolley 78 to hoist the same vertically upward and move the same inward to a trackway 79 on the shipping platform, after which the dolly may be switched onto other tracks 81 extending into the plant to any desired point for unloading the freight being received or preparing a loaded dolly for shipment.

Thus the method of handling freight is provided wherein less than carload lots may be packed and loaded upon a dolly at the point of production or assembly in a plant, and moved intact to the shipping platform and thereafter deposited intact on the open platform of the car, and thereafter moved intact on its own wheels, and if desired under its own power, into the fixed housing of the car. The load is then transported to its destination on the dolly which is cushioned from the shocks due to changes in speed and direction by the special shock absorbing coupling devices. The load is preferably received as an intact shipment at its destination, and lifted intact by a suitable overhead hoisting means to a point of delivery or to a trackway on which it can proceed on its own running gear, and driven under its own power if desired, to the point of unloading. A partial use of the method just outlined may be carried out and either the loading or the unloading of the dolly may be carried out by hand labor much more easily than with side door box cars, or unloading by means of a small crane may take place at the point of delivery and a gain in time of handling be noted over the equivalent time required if the shipment were made in a standard type box car with side doors, notwithstanding that small mechanical unloading means in the form of power trucks with or without load hoists might be utilized, inasmuch as the time required to enter a side door car and turn within the enclosed car is far greater than that required to load or unload from an open platform. This desire of manufacturers to use overhead hoisting apparatus is illustrated in the current shipping practice, wherein steel plates for automobile manufacture are frequently shipped in open freight cars rather than in closed box cars, notwithstanding that such shipments require very careful wrapping to protect them from the weather, and are often subject to great deterioration, because of moisture gaining access to the metal. Since such open cars are not suited to carrying finished products, such open freight cars often return empty to the point of original shipment, thus increasing "empty mileage".

To a very large extent the special packaging of goods shipped in the cars herein described may be dispensed with, inasmuch as such goods are received within moisture proof fixed housings and the loads are cushioned against shock and destruction of the containers by being carried on platforms having buffer springs to connect them with the car ends. Many other advantages of the invention are inherent in this construction, as will be evident from the use of the same, and it is particularly pointed out that a number of shippers requiring cars for small shipments may use the car in one direction and a single shipper requiring large capacity may use the car in another direction; and each of the parties may have the full advantage of a locked private car space. Thus a service equivalent to full private shipping service such as might be afforded by two single small freight cars is provided in a structure wherein no duplication of trucks, air brakes, and like appurtenances, is involved, and at the same time the special load-handling facilities above set forth are provided for.

Through the use of separate compartments, mixed shipments may be made in a single car without injury to one lot of goods by the other, in the case, for example, of chemicals and perishable articles of food which might be deleteriously affected by the proximity of chemicals in the same car space. Each compartment may be independently locked and sealed and when used by an individual shipper may receive a separate way bill.

As to the economy of constructing a car of this type, it is pointed out that even though a heavier frame may be found desirable because of the somewhat greater length of the car, the saving in the cost of trucks, brakes, and like accessories over a small two car equipment of equal capacity would more than compensate for the cost of any additional steel sills or reinforcement which the additional length might entail.

Other modes of applying the principle of my invention may be employed instead of the one explained, change being made as regards the structure and method herein disclosed provided the means or steps stated by any of the following claims, or the equivalent of such stated means, be employed.

I therefore particularly point out and distinctly claim as my invention:

1. A method of handling freight, which includes the steps of loading a plurality of independent dolly cars, moving said dolly cars with intact loads over trackways to a point adjacent a trackway on a railway car, transferring said dollies with intact loads to said car trackway, and moving each of said dollies on said trackway into an individual fixed housing on said car.

2. A method of handling freight, which includes the steps of loading a plurality of independent dolly cars, moving said dolly cars with intact loads over trackways to a point adjacent a trackway on a railway car, transferring said dollies with intact loads to said car trackway, moving each of said dollies on said trackway into an individual fixed housing on said car, and engaging each of said dollies in resilient relation with said car within said fixed housing.

3. A method of handling freight, which includes the steps of loading a plurality of independent dolly cars, moving said dolly cars with intact loads over trackways to a point adjacent a trackway on a railway car, transferring said dollies with intact loads to said car trackway, moving each of said dollies on said trackway into an individual fixed housing on said car, engaging each of said dollies in resilient relation with said car within said fixed housing, and thereafter closing the open end of said housing.

4. A method of handling freight in less than carload lots which includes the steps of loading said freight upon a dolly car supported on tracks on a freight car, moving said dolly on said tracks to a position within an enclosed housing on said freight car, moving said freight car to its point of destination, moving said dolly on said tracks to the open area of said freight car, and removing the load from said dolly by means of an overhead hoisting apparatus.

5. The method of handling freight which consists in loading a plurality of less than carload lots of freight upon individual dollies supported on flanged wheels engaging standard gage railway tracks, moving said dollies with intact loads to a shipping platform adjacent to railroad cars having floors equipped with standard gage rails, moving said dollies with intact loads upon said rails and into individual enclosed housings upon said railroad cars, moving said freight to a point of destination, moving said dollies with intact loads to the open areas of said freight cars, transferring said dollies with intact loads to a standard gage railway track, and moving dollies intact loads along said tracks to point of delivery.

6. A method of handling freight in less than carload lots, which comprises the steps of loading a plurality of dollies with freight to be loaded intact in a closed housing on a car, moving of one of said dollies to an open area centrally of a car, and moving said dolly from said open area into a fixed enclosure at the end of said car, resiliently supporting said dolly within said enclosure, and then moving a second dolly to the central area of said car, and moving said second dolly into a fixed enclosure on the opposite end of said car and resiliently supporting said second dolly within said second enclosure.

7. A method of handling freight which comprises the steps of loading freight by means of an overhead hoist upon a dolly car positioned on an open platform centrally of a freight car, having a fixed housing adjacent thereto, and thereafter moving said dolly into said housing and resiliently supporting said dolly by means of a pair of shock absorber elements to cushion road shocks.

8. A method of handling freight which includes the steps of providing a standard railroad trackway, a primary load-supporting car engaged upon said trackway and having a housing thereon, a standard gage trackway supported on said car, and moving a secondary load-supporting car successively over said respective trackways and into said housing.

9. A method of handling freight which includes the steps of providing a standard railroad trackway, a primary load-supporting car engaged upon said trackway and having a housing thereon, a standard gage trackway supported on said car, moving a secondary load-supporting car successively over said respective trackways and into said housing, and resiliently anchoring said secondary load-supporting car in said housing.

10. A method of handling freight which includes the steps of providing a standard railroad trackway, a primary load-supporting car engaged upon said trackway, a standard gage trackway supported on said car, a secondary load-supporting car engaged upon said last-mentioned trackway, a fixed housing over said last-mentioned trackway, an open area for said trackway adjacent said housing, and moving said secondary load-supporting car from a position within said housing to said open trackway and thereafter to said standard railroad trackway for the distribution of the load.

11. A railway car having a fixed housing and an open platform and a load supporting floor movable into said housing from said platform.

12. A railway car having an open platform, a fixed housing adjacent thereto having a roof and side walls and one end wall, and a doorway in said housing adjacent said platform of substantially the full end area thereof.

13. A railway car having an open platform, a fixed housing adjacent thereto having a roof and side walls and one end wall, and a doorway in said housing adjacent said platform of substantially the full end area thereof, and a load supporting floor within said housing adapted to be drawn outwardly over said platform.

14. A railway car having an open platform at a central position, a fixed housing at each end of said car and having an opening of substantially the full end area of each of said housings, respectively, adjacent said platform, and a load supporting floor within each housing adapted to be moved alternatively outwardly over said open platform.

15. A railway car having an open platform at a central position, a fixed housing at each end of said car and having an opening of substantially the full end area of each of said housings, respectively, adjacent said platform, a trackway extending the full length of said car into said housings and over said open platform, and a load supporting floor within each housing adapted to be moved alternatively outwardly over said trackway to said open platform.

16. A railway car having closed fixed housings adjacent each end and an intermediate open platform, end doors on said housings adjacent said platform, movable load supporting floors within said respective housings, and adapted to be selectively moved over said open platform.

17. A railway car having closed fixed housings adjacent each end and an intermediate open platform, end doors on said housings adjacent said platform, movable load supporting floors within said respective housings, and means for moving said floors selectively from either of said housings over said open platform.

18. A railway car having a permanent structure providing a closed compartment and an open load transfer platform adjacent thereto, said compartment having an opening of substantially the full end area thereof adjacent said platform, and a vertically sliding closure for said opening.

19. In a railway or other vehicle the combination of a frame, a fixed housing mounted on said frame, and a stationary open load transfer platform adjacent said housing, and a full end doorway in the end of said housing adjacent said platform for loading and unloading said housing.

20. A railway car adapted for loading by overhead hoisting means, comprising a car frame, a floor extending over the full length of said frame, a housing over a portion of said floor, and a doorway in said housing adjacent the remaining open portion of said floor for loading and unloading said housing from said open floor space.

21. A railway car having in combination a frame, a floor extending over the full length of said frame, a wheel trackway on said floor, a portable wheeled platform on said trackway, a fixed housing over a portion of said trackway of a length to receive said portable platform, and an open area adjacent said housing of a length to receive said platform during loading and unloading operation.

22. A railway car having a fixed housing adjacent each end portion of said car, inside end doorways on said housings, and an open load transfer platform positioned between said housings, providing means for loading and unloading said housings.

23. A railway car having a fixed housing adjacent each end portion, inside end doorways on said housings, an open load transfer platform positioned between said housings, and a wheeled dolly car of a size to be received within one of said housings, and movable into said housing from said load transfer platform.

24. A railway car having a fixed housing adjacent each end portion, an open load transfer platform positioned between said housings, a wheeled dolly car of a size to be received within one of said housings and movable into said housing from said load transfer platform, and shock absorber means within said housing for securing said dolly in locked position therein and cushioning the load supported on said dolly car.

25. In a railway or other vehicle the combination of a frame, a fixed housing mounted on said frame, an open load transfer platform adjacent said housing, a doorway in the end of said housing adjacent said platform, a dolly car adapted to be received on said platform and to be moved within said housing, and a pair of resilient coupling elements mounted on said dolly car and the interior of said housing structure for holding said car in place and cushioning the load.

26. In a railway or other vehicle the combination of a frame, a fixed housing mounted on said frame, an open load transfer platform adjacent said housing, a doorway in the end of said housing adjacent said platform, a dolly car adapted to be received on said platform and to be moved within said housing, a pair of resilient coupling elements mounted on said dolly car and the interior of said housing structure for holding said car in place and cushioning the load, and means for elevating and anchoring said dolly car adjacent the roof of said housing.

27. In a railway or other vehicle the combination of a frame, a fixed housing mounted on said frame, an open load transfer platform adjacent said housing, an opening in the end of said housing adjacent said platform, a dolly car adapted to be received on said platform, means for moving said dolly car into said housing, a pair of resilient coupling elements mounted on said dolly car and on the interior of said housing structure for holding said car in place and cushioning the load, and means for releasing said coupling.

28. A method of converting standard railway freight cars of closed box side door type into cars with fixed end housings and an intermediate loading space which includes the steps of removing the superstructure of said cars intermediate lines defining planes spaced toward the ends of said car from said side door positions, and placing end doors as closures for the remainder of said car structure.

Signed by me this eighth day of February, 1932.

WILLIAM S. DIETRICH.